United States Patent [19]

Nishino et al.

[11] 4,256,728
[45] Mar. 17, 1981

[54] DEODORIZATION METHOD

[75] Inventors: Hiroshi Nishino, Osaka; Toshio Aibe, Toyonaka; Fumiichi Ogino, Kawanishi, all of Japan

[73] Assignee: Takeda Chemical Industries, Ltd., Osaka, Japan

[21] Appl. No.: 83,948

[22] Filed: Oct. 11, 1979

[30] Foreign Application Priority Data

Oct. 11, 1978 [JP] Japan ................... 53-125436

[51] Int. Cl.³ .............................................. A61L 9/00
[52] U.S. Cl. .................................... 422/4; 422/5; 422/122; 422/171; 423/230; 423/237; 423/239; 423/244; 423/245
[58] Field of Search ............ 422/4, 5, 170, 171, 422/900, 122; 423/230, 237, 239, 244 R, 245

[56] References Cited

U.S. PATENT DOCUMENTS

| | | | |
|---|---|---|---|
| 1,716,481 | 6/1929 | Bilsky | 422/4 |
| 3,116,970 | 1/1964 | Storp et al. | 423/230 X |
| 3,556,716 | 1/1971 | Pollio et al. | 423/230 X |
| 4,162,209 | 7/1979 | Gomez et al. | 422/4 X |

FOREIGN PATENT DOCUMENTS

| | | | |
|---|---|---|---|
| 761027 | 6/1971 | Belgium | 423/230 |
| 2400688 | 7/1975 | Fed. Rep. of Germany | 422/4 |
| 2308399 | 11/1976 | France | 422/5 |
| 46-38280 | 11/1971 | Japan | 422/5 |
| 77043618 | 11/1974 | Japan | 422/5 |
| 51067733 | 12/1974 | Japan | 422/5 |
| 7015132 | 4/1971 | Netherlands | 423/230 |

*Primary Examiner*—Barry Richman
*Attorney, Agent, or Firm*—Wenderoth, Lind & Ponack

[57] ABSTRACT

A deodorization method which comprises allowing a bad-smelling gas containing (a) hydrogen sulfide and/or a mercaptan, (b) a sulfide and/or a disulfide and (c) ammonia and/or an amine to contact (1) firstly with activated carbon, (2) then with activated carbon or clay mineral having an acid supported thereon, and (3) subsequently with activated carbon in the presence of chlorine or bromine.

5 Claims, No Drawings

DEODORIZATION METHOD

The present invention relates to a method for efficient deodorization of malodorous gases containing various kinds of bad-smelling components such as hydrogen sulfide, mercaptans, sulfides, disulfides, ammonia and amines.

In factories for treatment of human wastes, sewage disposal plants, garbage and refuse disposal plants, animal-quarters, unavoidable is evolution of waste gases containing various kinds of malodorous components such as hydrogen sulfide, mercaptans, sulfides, disulfides, ammonia and amines.

Deodorizing agents or methods for individual bad-smelling components, have been studied and developed so far, and have proven satisfactory in their deodorizing effects. In the case of deodorization of gases containing simultaneously a number of bad-smelling components, nevertheless, treatment of such gases with a mere mixture of these individual deodorizing agents does not lead to a successful removal of the bad-smell. A variety of conventional deodorizing methods being attempted so far, such as alkali-acid absorption method, wet-process oxidation method, ozone oxidation method, activated-carbon adsorption method and combustion method, have not achieved completely their desired object yet.

Various investigations, as being conducted by the present inventors in view of these circumstances, led to the finding that the following deodorizing system displays the complete deodorizing effect even for gases containing a multiple number of bad-smelling components. That is to say, the present invention constitutes a deodorizing method characterized by allowing a gas containing as main bad-smelling components (a) hydrogen sulfide and/or a mercaptan, (b) a sulfide and/or a disulfide and (c) ammonia and/or an amine to contact (1) firstly with activated carbon, (2) then with activated carbon or clay mineral having an acid supported thereon and (3) subsequently with activated carbon in the presence of bromine or chlorine.

Out of the bad-smelling components which are to be deodorized in the present invention, as the mercaptans are mentioned, for example, alkylmercaptan such as methylmercaptan, ethylmercaptan and propylmercaptan, and arylmercaptan such as phenylmercaptan; as the sulfides are mentioned, for example, alkyl sulfide such as methyl sulfide and ethyl sulfide, and aryl sulfide such as phenyl sulfide; as the disulfides are mentioned, for example, alkyl disulfides such as methyl disulfide and ethyl disulfide; and as the amines are mentioned, for example, alkylamine such as methylamine and ethylamine, dialkylamine such as dimethylamine, diethylamine and methylethylamine, trialkylamine such as trimethylamine, dimethylethylamine and triethylamine, hydrazine, alkylene diamine such as methylene diamine, hydroxyamine, hydroxyalkylamine such as methanolamine and ethanolamine, arylamine such as aniline, and nitrogen-containing heterocyclic compounds such as pyridine, pyrrole, indole and skatol.

In the present invention, bad-smelling gas is allowed to contact firstly with activated carbon.

The activated carbon which is hereby useful may be any type of activated carbon produced from charcoal, coke, coconut shells, resins, etc. by the known activation method. Activated carbon having BET surface area of 200 to 2000 $m^3/g$ may be used for more effective or complete deodrization.

The gas having been contacted with the activated carbon is then allowed to contact with activated carbon or clay mineral having an acid supported thereon. As the activated carbon or clay mineral having an acid supported thereon which is hereby useful are mentioned activated carbon (BET surface area of 200 to 2000 $m^3/g$) or clay minerals such as allophane, diatomaceous earth, shale and zeolite, on which are supported inorganic acid such as sulfuric acid, hydrochloric acid, hydrobromic acid and phosphoric acid or organic acid such as oxalic acid and citric acid.

Allophane, amorphous alumino-silicate salts, is a kind of volcanic ash soils widely distributing in the volcanic zones throughout the world inclusive of Japan.

Diatomaceous earth is an amorphous clay composed mainly of $SiO_2 \cdot xH_2O$ formed through sedimentation on the sea bottom of remains of algae called diatom, and is exemplified by the naturally occurring one itself or calcined at 200 to 900° C.

Shale is a clay consolidated in a stratified form through compression of volcanic ash soils on the sea bottom, and its main components are represented by $SiO_2$ and $Al_2O_3$. Shale possesses the nature of expanding and degassing through calcination to form porous, pumice-like aggregates, and especially preferable is the shale calcined.

Zeolite is a naturally occurring mineral formed through crystallization of volcanic ash soils, and preferable are mordenite, chrynopthiolite, phillipsite, etc.

An amount of acid to be supported on activated carbon or clay mineral is preferably within the range of 1 to 40% by weight, more preferably 3 to 20% by weight relative to the weight of the activated carbon or clay mineral. When clay minerals such as zeolite, allophane, diatomaceous earth, shale are employed as a support, co-use of sulfuric acid and phosphoric acid may be preferable, where desirable ratio of sulfuric acid to phosphoric acid is 1 to 0.5–10 by weight.

As the means of supporting an acid is mentioned a means of immersing a support in an aqueous solution of an acid to impregnate the support with the acid, followed by drying if necessary, or spraying an acid or its aqueous solution over the support, followed by drying if necessary.

The gas having been contacted with activated carbon or clay mineral having an acid supported thereon is further allowed to contact with activated carbon in the presence of bromine or chlorine. As the mode of contacting the gas with activated carbon in the presence of bromine or chlorine are mentioned, for example, (1') a method of adding chlorine or bromine to a gas to be contacted with activated carbon, (2') a method of contacting a gas with chloro- or bromoisocyanuric acid or its salt, and then with activated carbon, and (3') a method of contacting a gas with activated carbon having bromine supported thereon.

As chlorine which is useful in the method mentioned above under the item (1') are mentioned one from a liquefied-chlorine cylinder and one obtained by evolution of chlorine, such as that of adding an acid, e.g. hydrochloric acid, sulfuric acid and nitric acid, to hypochlorite, chlorite, chlorate, etc. Particularly, a method of adding sulfuric acid to sodium hypochlorite is economical and preferable.

As bromine are mentioned one obtained from vaporization of liquefied bromine, and one obtained from evolution of bromine, such as those of adding to a hypobromite an acid, e.g. hydrochloric acid, sulfuric acid and nitric acid, and adding to a bromine compound such as potassium bromide, an oxidizing agent, e.g. nitric acid, hydrogen peroxide and ammonium persulfate. Particularly, the method of adding sulfuric acid to sodium hypobromite is economical and preferable.

A required amount of chlorine or bromine is preferably in the range of 0.2 to 1 mole against 1 mole of bad-smelling components contained in a gas to be treated.

As chloro- or bromoisocyanuric acid and their salts described under the item (2') are mentioned, for example, monochloro- or bromoisocyanuric acid, dichloro- or bromoisocyanuric acid, trichloro- or bromoisocyanuric acid, and their salts with alkali metals. In case where gas is allowed to contact with chloro- or bromosiocyanuric acid or their salts, a space velocity of the gas is 500 to 500,000 $hr^{-1}$ and, preferably, 1,000 to 250,000 $hr^{-1}$, whereas a contacting temperature is not higher than 100° C. and, preferably, 5 to 50° C.

As activated carbon having bromine supported thereon which is useful in the case of the item (3'), suitably employed is the activated carbon (200 to 2,000 $m^2/g$ of BET surface area) having 0.02 to 0.40 mg of bromine per $m^2$ of the specific surface area of the activated carbon supported thereon. As the means of supporting bromine on activated carbon are mentioned, for example (i) a gaseous-phase adsorption method comprising contacting a carrier gas containing bromine gas with activated carbon, (ii) a liquid-phase adsorption method comprising immersing activated carbon in bromine water, and a method of spraying liquid bromine directly over activated carbon for adsorption.

The gas-solid contact in which a bad-smelling gas to be treated in the present invention is allowed to contact with activated carbon, acid supporting activated carbon or clay mineral, and activated carbon in the presence of chlorine or bromine may be effected by any of moving-bed or a fixed-bed, whereby the space velocity of a gas in each of the adsorbent beds is about 50 to 10,000 $hr^{-1}$, and preferably, about 360 to 7,200 $hr^{-1}$; and, the contacting temperature is about 0 to 100° C., and preferably, 15 to 50° C.

In the present invention, the sequence of treatments of a gas, (1) (2) and (3), is of vital importance, and an sequences other than this reduces the desired effect by half.

In the present invention, in case a gas contains, in addition to aforementioned bad-smelling components, aldehydes (e.g. alkyl aldehyde such as formaldehyde and acetaldehyde), fatty acids (e.g. alkyl carboxylic acid such as formic acid, acetic acid and butyric acid), ketones (alkyl ketones such as acetone and methyl ethyl ketone), hydrocarbons (e.g. aliphatic hydrocarbons such as pentane, and hexane, and aromatic hydrocarbons such as benzene, toluene and xylene) and others, the above mentioned deodorization method performs the almost complete deodorization as well, and permits the wholly complete deodorization by further treating with activated carbon finally, if necessary.

EXAMPLE 1

Activated carbon A:
Granular-formed activated carbon of 4 to 6 mesh (1240 $m^2/g$ of BET specific surface area).
Sulfuric acid supporting activated carbon B:
Activated carbon A having supported thereon 10 wt. % of sulfuric acid, (35 wt. % of water content)
Bromine supporting activated carbon C:
Activated carbon A having supported thereon 10 wt. % of bromine, (1 wt. % of water content)
Sulfuric acid supporting zeolite D:
Natural zeolite of 4 to 6 mesh (Elemental Analysis (%): $SiO_2$ 68.3, $Al_2O_3$ 11.3, $Fe_2O_3$ 0.8, CaO 0.7, MgO 0.7, $K_2O$ 2.8, $Na_2O$ 2.9, produced by Ziekuraito Kagaku Kogyo) having supported thereon 10 wt. % of sulfuric acid, (15 wt. % of water content)

The adsorbents, A through D, are packed, in the order as shown in Table 1 from the gas-inlet side to the gas-outlet side, into each of 4-cm diameter, PVC-made columns, I through XII, to the layer height of 30 cm, respectively.

Air (relative humidity—80%) containing 5 ppm of $H_2S$, 0.8 ppm of $CH_3SH$, 0.2 ppm of $(CH_3)_2S$, 0.1 ppm of $(CH_3)_2S_2$, 1.3 ppm of $NH_3$ and 0.2 ppm of $(CH_3)_3N$ is allowed to flow through each of these columns at a linear flow rate of 30 cm/sec., whereby the gas from the outlet of the column is checked for detection of a malodorous smell, and the components leaked are discriminated by means of a gas chromatograph, with the results obtained as shown in Table 1.

TABLE 1

| No. of columns | The order in which the adsorbents are packed | Deodorization effect and kind of the components leaked |
|---|---|---|
| | (Gas-inlet layer) (Intermediate layer) (Gas-outlet layer) | |
| | (Order of Present Invention) | |
| I | A → B → C | Odorless even after 120 days, with good deodorization effect. |
| II | A → D → C | Odorless even after 120 days, with good deodorization effect. |
| | (Order other than Present Invention) | |
| III | B → C → A | Leakage of $H_2S$ begins after 13 days, with offensive smell |
| IV | D → C → A | Leakage of $H_2S$ begins after 13 days, with offensive smell |
| V | C → A → B | Leakage of $(CH_3)_2S$ begins after 18 days, with offensive smell |
| VI | C → A → D | Leakage of $(CH_3)_2S$ begins after 18 days, with offensive smell |
| VII | B → A → C | Leakage of $H_2S$ begins after 11 days, with offensive smell |
| VIII | D → A → C | Leakage of $H_2S$ begins after 11 days, with offensive smell |
| IX | C → B → A | Leakage of $(CH_3)_2S$ begins after 18 days, with offensive smell |

TABLE 1-continued

| No. of columns | The order in which the adsorbents are packed | Deodorization effect and kind of the components leaked |
| --- | --- | --- |
| X | C → D → A | Leakage of $(CH_3)_2S$ begins after 18 days, with offensive smell |
| XI | A → C → B | Leakage of $(CH_3)_2S$ begins after 20 days, with offensive smell |
| XII | A → C → D | Leakage of $(CH_3)_2S$ begins after 20 days, with offensive smell |

EXAMPLE 2

Into a 10-cm diameter, PVC-made column are packed 2.4 l of activated carbon A as described in Example 1 on the side of a gas inlet, 2.4 l of zeolite having sulfuric acid supported thereon as described in Example 1 in the intermediate layer (part 1) 1.2 l of activated carbon having bromine supported thereon as described in Example 1 in the intermediate layer (part 2), and 2.4 l of granular-formed activated carbon of 4 to 6 mesh (1360 $m^2/g$ of BET surface area) on the side of a gas outlet. A ventilation gas from a sand settlement pond of the sewage treatment plant is allowed to flow through the column at the ambient temperature at a linear flow rate of 30 cm/sec.; the gas is found to contain the following components (as indicated in the average concentration):

41 ppb of hydrogen sulfide, 40 ppb of methylmercaptan, 20 ppb of methyl sulfide, 15 ppb of methyl disulfide, 185 ppb of ammonia, 3.5 ppb of trimethylamine, 17 ppb of benzene, 128 ppb of toluene, 91 ppb of xylene, 41 ppb of ethyl toluene, 64 ppb of trimethyl benzene and about 150 ppb of other aromatic hydrocarbons (in addition, a large number of components such as aldehydes, halogenated hydrocarbons and phenols are contained).

The gas from the outlet of the column is kept odorless after continuous operation for 130 days; and, the concentrations of hydrogen sulfide, methylmercaptan, methyl sulfide, ammonia and trimethylamine are all found to be not more than 0.5 ppb.

EXAMPLE 3

Into the column No. 1 of Example 1 is packed, in lieu of the activated carbon C having bromine supported thereon, the activated carbon A to the layer height of 30 cm, followed by mixing 1 ppm of bromine gas into an outlet gas from the layer packed with the activated carbon B to conduct a test in the same manner as described in Example 1; after 120 days, the gas from the outlet of the column is kept odorless, with the good deodorization effect.

In the above mentioned test, furthermore, 1 ppm of chlorine gas in place of bromine gas is mixed to conduct the similar test, resulting in the same deodorization effect as described above.

EXAMPLE 4

In place of the activated carbon C having bromine supported thereon in the column No. 1 of Example 1, the activated carbon A is packed to a layer height of 30 cm, and a gap of about 15 cm is provided on the 40 mm PVC pipe connecting an outlet of the activated carbon layer B with the activated carbon A being packed in place of the activated carbon C, whereby 10 pieces of tablet-formed trichloroisocyanuric acid (30 mm × 14 $mm^L$) are placed into the resulted space, to conduct a test in the same manner as described in Example 1; after 50 days, the outlet of the column remains odorless.

EXAMPLE 5

In place of the surfuric acid supporting zeolite D in the column No. 2 of Example 1, zeolite having supported thereon 2.5 wt. % of sulfuric acid and 10 wt. % of phosphoric acid is packed to the same layer as that used in Example 1 and a test was carried out in the same manner as described in Example 1. After 120 days, the outlet of the column remains odorless.

What is claimed is:

1. A deodorization method which comprises allowing a gas containing as main bad-smelling components (a) hydrogen sulfide and/or a mercaptan, (b) an organic sulfide and/or an organic disulfide and (c) ammonia and/or an amine to contact (1) firstly with activated carbon, (2) then with activated carbon or clay mineral having an acid supported thereon, and (3) subsequently with activated carbon in the presence of chlorine or bromine.

2. A method as claimed in claim 1, wherein the gas is contacted (1) firstly with activated carbon having 200 to 2,000 $m^2/g$ of a specific surface area, (2) then with activated carbon having sulfuric acid supported thereon, and (3) subsequently with activated carbon having bromine supported thereon.

3. A method as claimed in claim 2, wherein an amount of sulfuric acid to be supported on activated carbon is 1 to 40 weight percent relative to the activated carbon and an amount of bromine to be supported on activated carbon is 0.02 to 0.4 mg per $m^2$ of a specific surface area of the activated carbon.

4. A method as claimed in claim 1, wherein the gas is contacted (1) firstly with activated carbon having 200 to 2,000 $m^2/g$ of a specific surface area, (2) then with clay mineral having sulfuric acid and phosphoric acid supported thereon, and (3) subsequently with activated carbon having bromine supported thereon.

5. A method as claimed in claim 4, wherein an amount of sulfuric acid and phosphoric acid to be supported on clay mineral is 1 to 40 weight percent relative to the clay mineral and the ratio of sulfuric acid to phosphoric acid is 1 to 0.5–10 by weight, and an amount of bromine to be supported on activated carbon is 0.02 to 0.4 mg per $m^2$ of a specific surface area of the activated carbon.

* * * * *